United States Patent [19]
Nishida et al.

[11] Patent Number: 5,830,101
[45] Date of Patent: Nov. 3, 1998

[54] AUTOMATIC TRANSMISSION

[75] Inventors: Masaaki Nishida; Nobutada Sigiura; Kazumasa Tsukamoto; Masahiro Hayabuchi; Mitsutaka Ito, all of Anjo, Japan

[73] Assignee: Aisin Aw Co., Ltd., Anjo, Japan

[21] Appl. No.: 841,756

[22] Filed: Apr. 28, 1997

[30] Foreign Application Priority Data

Apr. 26, 1996 [JP] Japan .................................. 8-129232

[51] Int. Cl.⁶ ...................................................... F16H 3/00
[52] U.S. Cl. ........................................... 475/285; 475/331
[58] Field of Search ..................................... 475/285, 284, 475/331, 200, 206

[56] References Cited

U.S. PATENT DOCUMENTS 4,537,092 8/1985 Morisawa ................................ 475/285

FOREIGN PATENT DOCUMENTS 5-280602 10/1993 Japan .

Primary Examiner—Dirk Wright
Attorney, Agent, or Firm—Oliff & Berridge, PLC

[57] ABSTRACT

A compact structure for a speed change mechanism within a transmission is shown. An automatic transmission includes an input shaft supported at its opposite ends, an input member operatively connected to a first end of the input shaft, an output member mounted on a second end of the input shaft, and a speed change mechanism disposed between the input member and the output member, and including planetary gear trains supported on the input shaft. The portion of the input shaft supporting the planetary gear trains need not transmit torque, thus allowing the use of a reduced diameter input shaft.

10 Claims, 2 Drawing Sheets

|   | C1 | C2 | C3 | B1 | B2 | B3 | B4 | B5 | F1 | F2 | F3 | Gear Ratio |
|---|---|---|---|---|---|---|---|---|---|---|---|---|
| N |   |   |   |   |   |   |   |   |   |   |   |   |
| 1ST | O |   |   |   |   | (O) |   | (O) | O | O |   | 5.616 |
| 2ND | O |   |   | (O) | O |   |   | (O) | O |   | O | 3.371 |
| 3RD | O |   |   | (O) | O |   | O |   | O |   |   | 2.122 |
| 4TH | O |   | O | (O) | O |   |   |   | O |   |   | 1.408 |
| 5TH | O | O | O |   |   |   |   |   |   |   |   | 1.000 |
| REV |   | O |   |   |   | O |   | O |   |   |   | 5.496 |

AUTOMATIC TRANSMISSION

BACKGROUND OF THE INVENTION

1. Field of Invention

This invention relates to an automatic transmission, particularly a power transmission structure between planetary gear trains in a speed change mechanism and its supporting shaft.

2. Description of Related Art

A speed change mechanism disclosed in JP-A No. 5-280602 having one end for receiving power and the other end for sending out power has an input shaft supported at its opposite ends, and supporting a planetary gear train and an output gear between its opposite ends. In this speed change mechanism, a connecting part for transmitting power to the speed change element of the planetary gear train is disposed on the other side of the speed change mechanism, i.e., at a position on the input shaft on the side of the output gear. Therefore, an input torque applied to one end of the input shaft is transmitted through the other end of the input shaft to the planetary gear train, and hence the planetary gear train is supported on the outer circumference of a torque transmitting part of the input shaft for transmitting the input torque.

In this related art, the input shaft is supported at its opposite ends and hence the planetary gear train and other parts are supported satisfactorily on the input shaft. Since the planetary gear train is supported on the input shaft, the input shaft must have both a strength to support the planetary gear train and a torsional strength high enough for torque transmission. Therefore, the diameter of a portion of the input shaft on which the planetary gear train is supported needs to be increased; consequently, the diameter of the planetary gear train is increased and the size of the speed change mechanism increases.

SUMMARY OF THE INVENTION

Accordingly, it is a first object of the invention to provide an automatic transmission capable of satisfactorily supporting planetary gear trains, having a shaft of a reduced diameter for supporting the planetary gear trains, and including a compact speed change mechanism.

A second object of the invention is to provide a compact structure for an automatic transmission having two parallel shafts of reduced diameters.

With the foregoing object in view, the invention provides an automatic transmission comprising: an input shaft supported at its opposite ends; an input member connected to a first end of the input shaft; an output member mounted on a second end of the input shaft; and a speed change mechanism disposed between the input member and the output member, and including planetary gear trains supported on the input shaft. The planetary gear trains are connected to the input shaft on a first end of the input shaft where the input member is connected, and are connected to the output member on a second end of the input shaft where the output member is mounted.

The automatic transmission may further comprise a first shaft coaxial with an output shaft of an engine; a second shaft parallel to the first shaft; and a main speed change mechanism having a plurality of speed stages including a reduction ratio, and disposed on the side of the first shaft. The input shaft is disposed on the side of the second shaft, the input member is operatively connected to the output member of the main speed change mechanism, the speed change mechanism serves as an auxiliary transmission to which the power of the main speed change mechanism is transmitted.

According to the invention, the planetary gear trains are securely supported on the input shaft which is supported at its opposite ends. Since the planetary gear trains are connected to one end of the input shaft on the side of the input member, a portion of the input shaft supporting the planetary gear trains on the side of the output member need not transmit the input torque and need not have strength for transmitting the input torque. Therefore, the diameter of the portion of the input shaft may be relatively reduced and hence the planetary gear trains can be formed in relatively reduced diameters. Thus, the planetary gear trains are supported securely and the speed change mechanism can be formed in a compact structure.

In a preferred embodiment of the present invention, two parallel shafts are provided with a first shaft being coaxial with an output shaft of an engine and supporting a main speed change mechanism that provides a plurality of speed change stages including a reduction ratio. An output member of the main speed change mechanism on the first shaft transmits power to an input member connected to one end of the second shaft.

Planetary gear trains mounted on the second, or input shaft provide a sub speed change mechanism to which the power of the main speed change mechanism is transmitted. Power from the main speed change mechanism is transmitted to the input member at one end of the input shaft, and then through a relatively short section of the input shaft into a component of the planetary gear trains. The power is then transmitted through the planetary gear trains, rather than the input shaft, to an output member of the transmission. Another component of the planetary gear trains is connected directly to the transmission output member that is rotatably supported on the end of the input shaft opposite from the end on which the input member is connected.

As a result of the above described structure, the portion of the input shaft supporting the planetary gear trains need not have strength for transmitting a large torque through the sub speed change mechanism when an increased torque is output by the main speed change mechanism set in a reduction speed stage. Therefore, the diameter of the input shaft may be reduced and the planetary gear trains can be formed in reduced diameters, thereby allowing the automatic transmission to be formed in a compact structure. Since the two parallel shaft may be disposed at a short center distance, the automatic transmission can be formed in a compact structure.

DETAILED DESCRIPTION OF PREFERRED EMBODIMENTS

Figures 2, 3:
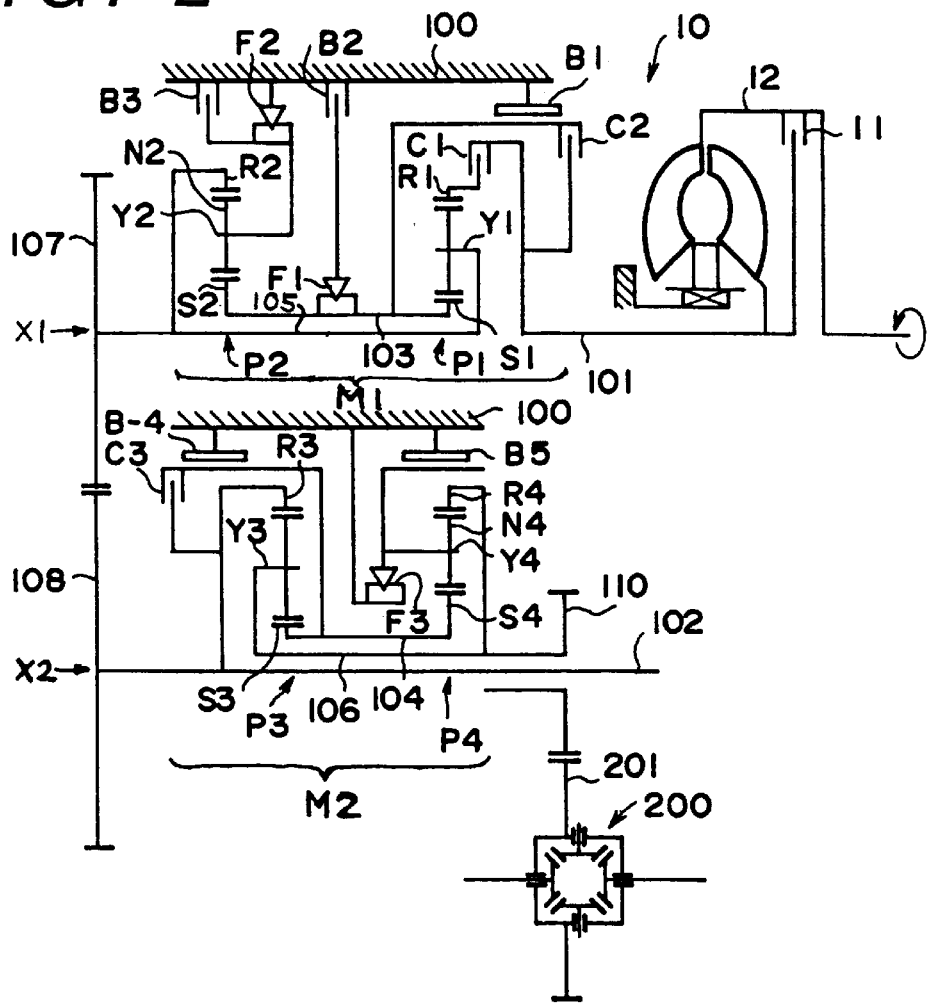
FIG. 2 is a diagrammatic view of the automatic transmission of FIG. 1.
FIG. 3 is an illustrative table showing the condition of the components of the automatic transmission of FIG. 1 for various speeds.

Preferred embodiments of the invention will be described hereinafter with reference to the accompanying drawings. First the general structure of a gear train of an automotive automatic transmission embodying the invention will be described. Referring to FIG. 2, an automatic transmission 10 is intended for use on a front-engine front-drive vehicle and provides five forward speeds and one reverse speed. The transmission 10 has two parallel shafts. A first speed change mechanism M1 including two planetary gear trains P1 and P2 is disposed coaxially with a first input shaft 101 on the side of a first axis X1 coaxial with a torque converter 12 provided with a lock-up clutch 11. A second speed change mechanism M2 including two planetary gear trains P3 and P4 is mounted on a second input shaft 102 on the side of a second axis X2.

The two speed change mechanisms M1 and M2 are substantially the same in structure. Front sun gears S1 and S3 and rear sun gears S2 and S4 of the speed change mechanisms M1 and M2 are mounted on sun gear shafts 103 and 104. Front carriers Y1 and Y3 and rear ring gears R2 and R4 are connected by an intermediate shaft 105 on the side of the first axis X1 and an output shaft 106 on the side of the second axis X2. The intermediate shaft 105 on the side of the first axis X1 and the input shaft 102 on the side of the second axis X2 are interlocked by a counter drive gear 107 and a counter driven gear 108 mounted on the intermediate shaft 105 and the input shaft 102, respectively. An output gear 110 mounted on the output shaft 106 on the side of the second axis X2 is meshed with a differential ring gear 201 of a differential gear 200.

A ring gear R1 on the side of the first axis is connected to and disconnected from the input shaft 101 by a clutch C1. The sun gear shaft 103 is connected to and disconnected from the input shaft 101 by a clutch C2, can be locked to a transmission case 100 by a band brake B1, and connected to and disconnected from the transmission case 100 by a one-way clutch F1 and a multiple disk brake B2 connected in series to the one-way clutch F1. A carrier Y2 can be connected to and disconnected from the transmission case 100 by a parallel arrangement of a one-way clutch F2 and a multiple disk brake B3.

A ring gear R3 is mounted on the input shaft 102 on the side of the second axis and connected with the input shaft 102. The sun gear shaft 104 is connected to the input shaft 102 by a clutch C3 and can be locked to the transmission case 100 by a band brake B4. A carrier Y4 can be connected to and disconnected from the transmission case 100 by a parallel arrangement of a one-way clutch F3 and a band brake B5.

In this automatic transmission 10, an output torque of an engine, not shown, or other power source, is transmitted through the torque converter 12 to the input shaft 101 of the main speed change mechanism M1 on the side of the first axis X1. As shown in FIG. 3, the torque of the input shaft 101 is not transmitted to the ring gear R1 and the sun gear shaft 103 and the automatic transmission 10 is placed in a neutral position when the clutches C1 and C2 are disengaged. The automatic transmission is placed in a first speed (1ST) when the clutch C1 is engaged as indicated by a blank circle. In this state, power is applied to the front ring gear R1, and through carrier Y1 and intermediate shaft 105 to rear ring gear R2. The one-way clutch F2 is locked as indicated by a blank circle to inhibit the reverse rotation of the carrier Y2. Consequently, the rear ring gear R2 rotates at a reduced rotating speed. The rotation of the rear ring gear R2 is transmitted through the counter gears 107 and 108 to the input shaft 102 on the side of the second axis. On the input shaft 102, power is transmitted to front ring gear R3 mounted immediately adjacent gear 108. Power is then transmitted through carrier Y3 and output shaft 106 to rear ring gear R4. The reverse rotation of the carrier Y4 is inhibited by locking the one-way clutch F3. Consequently, the rear ring gear R4 rotates at a reduced rotating speed. The output gear 110 rotates at a reduced rotating speed determined by two-stage speed reduction.

A second speed (2ND) is provided by additionally engaging the brake B2 as indicated by a blank circle. In this state, the locking action of the one-way clutch F1 becomes effective when the brake B2 is engaged, and therefore the reverse rotation of the sun gear shaft 103 is inhibited and the rotation of the carrier Y1 is transmitted to the intermediate shaft 105. The mode of torque transmission of the input shaft 102 on the side of the second axis is the same as that when the automatic transmission is set to the first speed.

A third speed (3RD) is provided by additionally engaging the brake B4. Only the condition of the input shaft 102 on the side of the second axis is different from that in the state where the automatic transmission is set to the second speed. The sun gear shaft 104 is restrained from rotation by the engagement of the brake B4. Power input from the front ring gear is outputted from the carrier Y3 at a reduced rotating speed. Therefore, the main speed change mechanism of the side of the intermediate shaft 105 and the sub speed change mechanism of the side of the input shaft 102 are at reduced rotating speed stages, and the carriers Y1 and Y3 rotate to contribute to a two-stage speed reduction.

A fourth speed (4TH) is provided by disengaging the brake B4 and engaging the clutch C3. Since the sun gear S3 and the ring gear R3 on the input shaft 102 on the side of the second axis X2 are engaged, the carrier Y3 is restrained from relative rotation and directly coupled. The output speed of the transmission is equal to the rotating speed of the output shaft 106, which is equal to the rotating speed of intermediate shaft 105 on the side of first axis X1.

A fifth speed (5TH) is provided by disengaging the brake B2 and engaging the clutch C2. The main speed change mechanism on the side of the intermediate shaft 105 transmits torque in a manner similar to that in which the input shaft 102 transmits torque in the fourth speed state. Both are connected directly and a maximum rotating speed is provided.

A reverse speed (REV) is provided by engaging the clutch C2 and the brakes B3 and B5. The torque of the input shaft 101 on the side of the first axis X1 is transmitted through the clutch C2 to the sun gear shaft 103, the ring gear R2 is rotated in the reverse direction by the rotation of the rear pinion N2 of the carrier Y2 restrained from revolution by the brake B3. The torque of the input shaft 101 is thus transmitted to the intermediate shaft 105, and the reverse rotation is transmitted from the ring gear R3 through a transmission path similar to that for the first speed to the output gear 110. In FIG. 3, blank circles in parentheses indicate engagement for applying engine brake.

Further description of the invention as applied to the mechanisms on the side of the second axis X2 of the automatic transmission 10 follows. The counter driven gear 108 is an input member to the sub speed change mechanism, the output gear 110 is an output member, and the sub speed change mechanism supported on the input shaft 102 includes the planetary gear trains P3 and P4. As shown in detail in FIG. 1 in a sectional view, the counter driven gear 108 which is mounted on one end of the input shaft 102 is rotatably supported in a radial roller bearing 15 on the end wall of the transmission case 100, and the other end of the input shaft 102 is supported in a radial roller bearing 16 on a torque converter housing 100a fixed to the transmission case 100.

The counter driven gear 108 is splined to one end of the input shaft 102. Therefore the counter driven gear 108 always rotates at the same speed as the input shaft 102. The counter driven gear 108 engages with the counter drive gear 107 to serve as an input member for transmitting power from the intermediate shaft 105 on the side of the first axis X1 to the input shaft 102 on the side of the second axis X2. The output gear 110, i.e., the output member on the side of the second axis X2, is rotatably supported by a pair of taper roller bearings 17 on the end of the input shaft 102 opposite from the end of input shaft 102 that supports input member 108.

Arranged between the counter driven gear 108 and the output gear 110 is the sub speed change mechanism M2 comprising the two planetary gear trains P3 and P4, the clutch C3, brakes B4 and B5 and the one-way clutch F3 for controlling the connection and disconnection of the speed change elements. In this embodiment, the sun gear shaft 104 of the two planetary gear trains P3 and P4 is mounted for rotation on a pair of bushings 13 mounted on the output shaft 106, and the output shaft 106 is mounted for rotation on a pair of bushings 14 mounted on the input shaft 102. Thus, the sun gear shaft 104 is supported for rotation indirectly on the input shaft 102.

Figure 1:
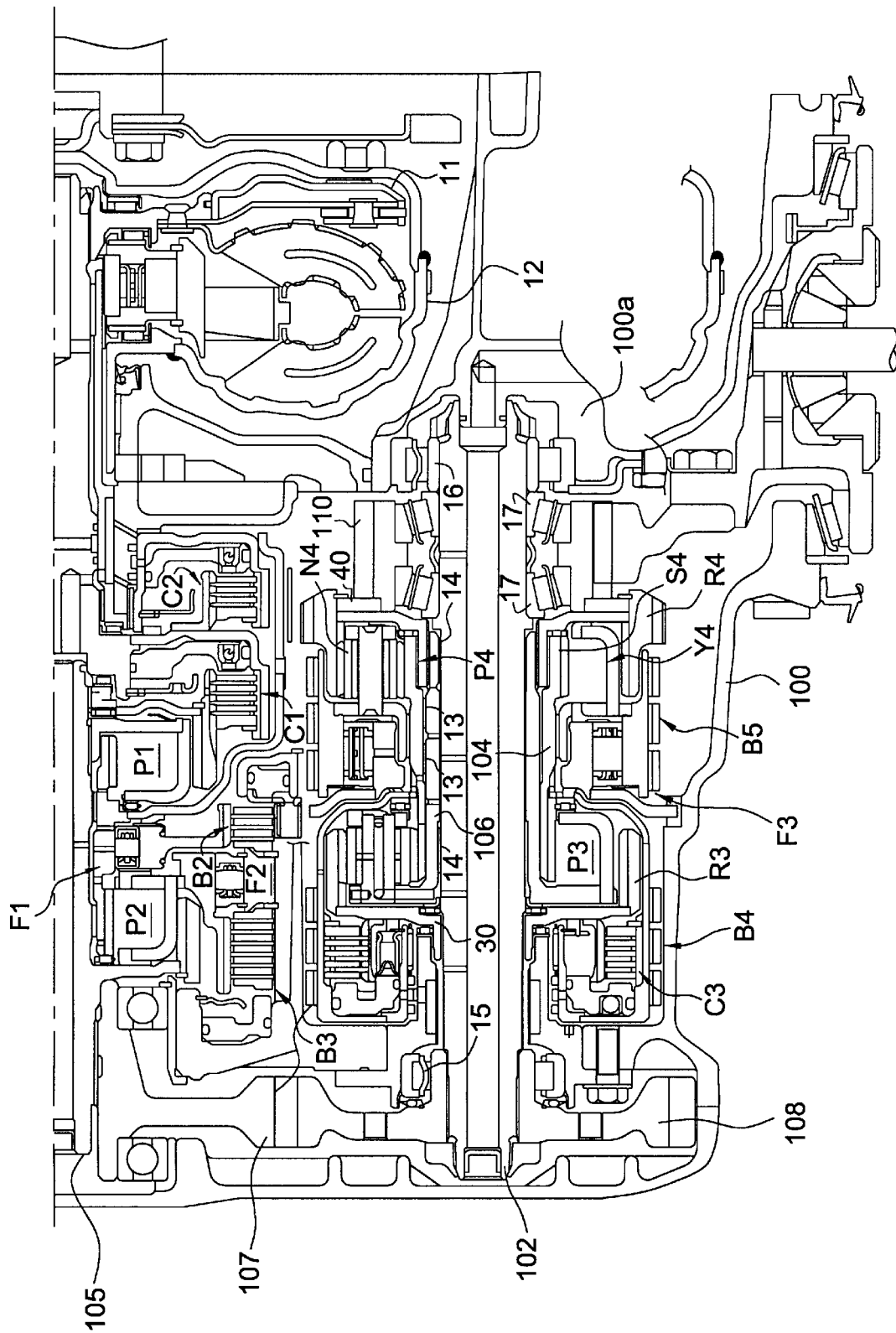
FIG. 1 is a sectional view of an automatic transmission in a preferred embodiment according to the invention.

The two planetary gear trains P3 and P4 are connected to one end of the input shaft 102 to which the counter driven gear 108 is operatively connected, and connected to the output gear 110 at the end at which the output gear 110 is disposed. More specifically, the flange 30 of the ring gear R3 of the front planetary gear train P3 is splined to be mounted unrotatably to the input shaft 102 on the second axis X2, and a ring gear flange 40 connecting the ring gear R4 of the rear planetary gear train P4 to the output shaft 106 is fixed to an end surface of the output gear 110. In FIG. 1, parts like or corresponding to those shown in FIG. 2 are designated by the same reference characters and the description thereof will be omitted.

In the automatic transmission thus constructed, power of a reduced speed and an enhanced torque of the mechanisms on the side of the first axis X1 is transmitted to the input shaft 102 on the side of the second axis X2 through the counter drive gear 107 and the counter driven gear 108 when the automatic transmission is set to a speed other than the fifth speed. The power is only transmitted through a part of the input shaft between where the ring gear flange 30 is splined to the input shaft 102, and where driven gear 108 is fixed to input shaft 102. The remaining length of the input shaft 102 along which the planetary gear trains P3 and P4 and output gear 110 are mounted, does not participate substantially in power transmission and functions only as a support shaft.

As discussed above, the torque transmitted through the ring gear flange 30 to the ring gear R3 is transmitted through the ring gear flange 40 of the planetary gear train P4 and the output gear 110 to the differential gear 200 when the automatic transmission is set to any speed. Therefore, the torque is never transmitted through the input shaft 102 beyond the point at which ring gear flange 30 is splined to input shaft 102.

Accordingly, in this embodiment, since the planetary gear trains P3 and P4 are mounted on the input shaft 102 supported at its opposite ends, the planetary gear trains P3 and P4 are supported with a high positional accuracy. Since the planetary gear trains P3 and P4 are operatively connected to one end of the input shaft 102 on the side of the counter driven gear 108 by the ring gear R3, the majority of the length of the input shaft 102 supporting the planetary gear trains P3 and P4 does not transmit the input torque.

Therefore, the input shaft 102 need not have a strength high enough to transmit the input torque and hence may be formed in a reduced diameter. Accordingly, the output shaft 106 supported on the outer circumference of the input shaft 102, the sun gear shaft 104 mounted on the output shaft 106 and the planetary gear trains P3 and P4 can be formed in reduced diameters. Therefore, the planetary gear trains P3 and P4 can be satisfactorily supported and the speed change mechanisms M1 and M2 can be constructed in reduced dimensions. Since the portion of the input shaft 102 supporting the planetary gear trains P3 and P4 of the sub speed change mechanism M2 which receives the enhanced torque from the main speed change mechanism M1 set in a reduction speed stage does not need a strength necessary for torque transmission, the same portion may be formed in a reduced diameter, the planetary gear trains P3 and P4 can be formed in further reduced diameters, and the automatic transmission can be formed in a compact structure. Therefore, the two parallel shafts 102 and 105 can be disposed at a short center-to-center distance to form the automatic transmission in a compact structure.

Although the invention has been described as applied to an automatic transmission which provides five forward speeds and one reverse speed for a front-engine front-drive vehicle, the invention is not limited thereto in its practical application and is applicable to general automatic transmissions, and many changes and variations may be made therein without departing from the scope and spirit thereof as set forth in appended claims.

What is claimed is:

1. An automatic transmission comprising:
    an input shaft supported at its opposite ends;
    an input member connected to a first end of the input shaft;
    an output member mounted on a second end of the input shaft;
    a sub speed change mechanism disposed between the input member and the output member, said sub speed change mechanism including planetary gear trains supported on the input shaft; and
    said planetary gear trains being operatively connected to the input shaft at said first end of said input shaft where the input member is connected, and being operatively connected to said output member.

2. The automatic transmission according to claim 1 further comprising:
    a first shaft coaxial with an output shaft of an engine;
    said input shaft being parallel to said first shaft;
    a main speed change mechanism having a plurality of speed stages including a reduction ratio, and being disposed along the first shaft; and
    the input member being connected to an output member of the main speed change mechanism, the sub speed change mechanism receiving the power of the main speed change mechanism through the input member.

3. An automatic transmission comprising:
    an input shaft having two opposite ends and being supported at said opposite ends;
    an input member being connected to a first end of said input shaft;
    an output member being rotatably supported on a second end of said input shaft, opposite said first end;
    a speed change mechanism being supported on said input shaft between said first and second ends, said speed change mechanism including first and second planetary gear trains;

a portion of said first planetary gear train being non-rotatably connected to said input shaft adjacent said first end and a portion of said second planetary gear train being non-rotatably connected to said output member such that all power received by said input member is transmitted through said first and second planetary gear trains to said output member.

4. The automatic transmission according to claim 3, wherein:

said portion of said first planetary gear train comprises a first ring gear and said portion of said second planetary gear train comprises a second ring gear.

5. The automatic transmission according to claim 4, wherein said portion of said second planetary gear train further comprises an output shaft rotatably supported on said input shaft.

6. The automatic transmission according to claim 5, wherein said output shaft is non-rotatably connected to a carrier, said carrier supporting a planet gear in intermeshing relationship with said first ring gear.

7. The automatic transmission according to claim 3, further including:

a first shaft coaxial with an output shaft of an engine, said input shaft being parallel to said first shaft;

a main speed change mechanism being disposed along said first shaft and having a plurality of speed stages including a reduction ratio;

a first shaft output member being mounted at one end of said first shaft and being engaged with said input member for transmitting power from said main speed change mechanism to said input member.

8. The automatic transmission according to claim 7, wherein:

said portion of said first planetary gear train comprises a first ring gear and said portion of said second planetary gear train comprises a second ring gear.

9. The automatic transmission according to claim 8, wherein said portion of said second planetary gear train further comprises an output shaft rotatably supported on said input shaft.

10. The automatic transmission according to claim 9, wherein said output shaft is non-rotatably connected to a carrier, said carrier supporting a planet gear in intermeshing relationship with said first ring gear.

* * * * *